United States Patent
Ambrose et al.

(10) Patent No.: US 6,624,249 B2
(45) Date of Patent: Sep. 23, 2003

(54) MODIFIED AMINOPLAST CROSSLINKERS AND POWDER COATING COMPOSITIONS CONTAINING SUCH CROSSLINKERS

(75) Inventors: Ronald R. Ambrose, Pittsburgh, PA (US); Anthony M. Chasser, Allison Park, PA (US); Shengkui Hu, Baden, PA (US); Jackie L. Smith, Mars, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/919,299

(22) Filed: Jul. 31, 2001

(65) Prior Publication Data

US 2003/0149191 A1 Aug. 7, 2003

Related U.S. Application Data

(63) Continuation-in-part of application No. 09/667,756, filed on Sep. 21, 2000, now abandoned, and a continuation-in-part of application No. 09/666,575, filed on Sep. 21, 2000, now Pat. No. 6,451,928.

(51) Int. Cl.$^7$ ................................................ C08G 12/40
(52) U.S. Cl. ................. 525/159; 525/162; 525/406; 525/443; 525/465; 525/509; 525/518; 525/519
(58) Field of Search ................. 525/443, 509, 525/159, 162, 406, 465, 518, 519

(56) References Cited

U.S. PATENT DOCUMENTS

| 3,759,854 A | 9/1973 | Chang et al. .................. 260/21 |
| 3,980,732 A | 9/1976 | Isaksen et al. ............... 260/850 |
| 4,151,220 A | 4/1979 | Watanabe et al. ........... 260/850 |
| 4,185,045 A | 1/1980 | Yoshihara et al. .......... 525/181 |
| 4,230,829 A | 10/1980 | Yoshihara et al. .......... 525/162 |
| 5,302,462 A | 4/1994 | Shah et al. .................. 428/482 |

FOREIGN PATENT DOCUMENTS

| GB | 1471183 | 4/1977 |

*Primary Examiner*—Patricia A. Short
(74) *Attorney, Agent, or Firm*—Diane R. Meyers

(57) ABSTRACT

A crosslinking agent which is an ungelled reaction product of (a) at least one aminoplast resin, (b) at least one polyfunctional polymer having functional groups reactive with aminoplast resin (a) and having a glass transition temperature of at least 15° C.; and (c) at least one compound different from (b) having active hydrogen groups reactive with aminoplast resin (a) is provided. Also provided is a method for preparing the crosslinking agent. Further provided is a powder coating composition which includes the crosslinking agent. Additionally provided is a multi-layer composite coating composition having a base coat layer and a top coat over the base coat deposited from the previously described powder coating composition. Coated substrates are also provided.

47 Claims, No Drawings

MODIFIED AMINOPLAST CROSSLINKERS AND POWDER COATING COMPOSITIONS CONTAINING SUCH CROSSLINKERS

CROSS-REFERENCE TO RELATED APPLICATIONS

This application is a continuation-in-part of U.S. patent application Ser. No. 09/667,756, now abandoned, and Ser. No. 09/666,575, now U.S. Pat. No. 6,451,928, both filed Sep. 21, 2000. Reference is made to related patent application Ser. Nos. 09/919,092; 09/918,848; 09/919,094; 09/918,983; and 09/918,788, filed concurrently herewith.

FIELD OF THE INVENTION

The present invention relates to crosslinking agents based on modified aminoplast resins and to powder coating compositions containing these crosslinking agents.

BACKGROUND OF THE INVENTION

In recent years, powder coatings have become increasingly popular because these coatings are inherently low in volatile organic content ("VOC"), which significantly reduces emissions of volatile organic compounds into the atmosphere during application and curing processes.

Hydroxyl, carboxyl, carbamate and/or epoxy functional resins, such as acrylic and polyester resins having relatively high glass transition temperatures ("$T_g$"), are commonly used as main film-forming polymers for these coatings. The relatively high $T_g$ of such polymers provides powder coatings having good storage stability. However when exposed to the extreme temperatures which can be encountered during shipping and/or storage in many geographic areas, even better powder coating stability is desired. By "storage stability" is meant the ability of the individual powder particles which comprise the powder coating to resist the tendency to adhere to one another, thereby causing "clumping" or "fusing" of the powder coating composition upon storage prior to application. Powder coating compositions having very poor storage stability can be difficult, if not impossible, to apply.

Aminoplast resins are well known in the art as low cost crosslinking agents for hydroxyl, carboxyl and/or carbamate functional polymers in conventional liquid coating compositions. Common aminoplast resins are based on condensation products of formaldehyde with an amino- or amido-group carrying substance. Examples of these aminoplast resins include the methylol and alkoxymethyl derivatives of ureas, melamines and benzoguanamines which are most commonly used in liquid coating compositions. Such aminoplast resins provide enhanced coating properties such as exterior durability, chemical resistance and mar resistance.

Attempts to produce powder coating compositions based on conventional aminoplast resins which exhibit these desirable properties heretofore have often been unsatisfactory because these materials typically are in liquid form and, as such, can cause poor powder stability.

The methoxylated aldehyde condensates of glycoluril, which are solid products, are the aminoplast resins most commonly employed as crosslinking agents in powder coating compositions. Although solid in form, these materials nonetheless can depress the $T_g$ of the powder coating composition significantly, even when combined with high $T_g$ film-forming polymers such as the acrylic polymers described above. Such a depression in $T_g$ also can result in poor powder stability.

Moreover, the use of conventional aminoplast resins in powder coating compositions can result in the phenomenon commonly referred to as "gassing". Gassing can occur as a result of vaporization of the alcohol generated in the thermally induced aminoplast crosslinking reaction. The alcohol vapor is driven off through the coating film upon heating and, as the viscosity of the coating increases during the curing process, "pinholes" or "craters" can be formed as the gas escapes through coating surface.

U.S. Pat. No. 3,759,854 discloses heat-fusible powder coating compositions prepared by pre-reacting a thermosetting polyester resin and a suitable crosslinking resin such as a condensation product of an aldehyde with melamine, urea or benzoguanamine. The reaction product typically is prepared from 1 to 50 weight percent of the amine-aldehyde material and the reaction is carried to an extent such that the resulting powder has a softening point of at least 65° C.

U.S. Pat. No. 5,302,462 discloses a process for preparing a partially cured, but non-gelled, powder coating composition. The powder coating composition is prepared by reacting a less than stoichiometric amount of methoxymethyl aminotriazine with a substantially linear, hydroxyl-terminated polyester. The ratio of polyester to triazine ranges from 97:3 to 70:30 by weight. Methanol is stripped from the reaction mixture under reduced pressure. The powder coating composition provides a cured film free of surface defects caused by outgassing of methanol which volatilizes during the curing process.

U.S. Pat. No. 3,980,732 discloses a process for preparing a curable powder resin composition having a sintering temperature above 40° C. The method comprises condensing a methylolamino compound with an aliphatic alcohol and an aliphatic diamide to produce an aminoplast condensate with a $T_g$ ranging from −10° C. to 100° C. and blending the aminoplast condensate with an acrylic or polyester resin having a glass transition temperature ranging from 60° C. to 100° C. The methylolamino compound is selected from methylolureas and methylolaminotriazines and contains no more than one unmethylolated NH bond per molecule. At least half of the methylol groups of the methylolamino compound have been condensed with the aliphatic alcohol or the aliphatic diamide. The molar ratio of the aliphatic alcohol to the methylolamino compound is at least 2; and the molar ratio of the methylolamino compound to the aliphatic diamide ranges from 1:0.5 to 1:1.5.

U.S. Pat. No. 4,185,045 discloses a powder coating composition comprising a solid crosslinking agent having a softening point ranging from 50° C. to 120° C. and prepared by heating 40 to 75% by weight of an acrylic polyol and 60 to 25% by weight of an alkoxyaminotriazine at 50° to 120°, and a base resin having a softening point ranging from 60° C. to 130° C. The alkoxyaminotriazine has less than one non-methylolated NH bond per triazine ring and at least 80% of the methylol groups have been etherified with an aliphatic or alicyclic alcohol or ethylene glycol monoalkyl ether.

U.S. Pat. No. 4,230,829 discloses a solid crosslinking agent having a softening point of 50° C. to 120° C. and prepared by heating 40 to 70 percent by weight of a polyester polyol and 60 to 30 percent by weight of an alkoxyaminotriazine. The alkoxyaminotriazine has one or less non-methylolated NH bond per triazine ring and at least 80 percent of the methylol groups have been alkoxylated with an alcohol. Powder coating compositions are prepared from a mixture of the crosslinking agent and a base resin having a softening point of 60° C. to 130° C.

While the above-described prior art aminoplast-based crosslinkers for powder coating compositions provide some improvement in gassing and powder stability over their liquid aminoplast counterparts, the powder coating compositions containing these crosslinkers can, nonetheless, exhibit some of the aforementioned deficiencies. In addition, many of the crosslinkers disclosed in the prior art can be high molecular weight, high viscosity, or partially cured, and, thereby, unstable mixtures. Thus, there remains a need for an aminoplast crosslinking agent suitable for use in powder coating compositions which provides a storage stable powder composition having the desirable coating properties usually associated with aminoplast-based liquid coatings without causing coating surface defects due to "gassing".

SUMMARY OF THE INVENTION

In accordance with the present invention, provided is a crosslinking agent comprising the ungelled reaction product of (a) at least one aminoplast resin, (b) at least one polyfunctional polymer comprising functional groups reactive with aminoplast resin (a) and having a glass transition temperature of at least 15° C.; and (c) at least one compound different from (b) having active hydrogen groups reactive with aminoplast resin (a). The compound (c) is selected from at least one of (i) compounds having the following structure (I):

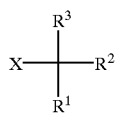

(I)

wherein X is aromatic; $R^1$, $R^2$, and $R^3$ can be the same or different and each independently represents H, (cyclo) alkyl having from 1 to 12 carbon atoms, aryl, alkaryl, aralkyl, or an active hydrogen-containing group, provided that at least one of $R^1$, $R^2$, and $R^3$ represents an active hydrogen-containing group which is reactive with the aminoplast resin (a); (ii) compounds having the following structure (II or III):

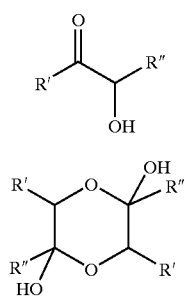

where R' and R" are the same or different and each independently represents an aromatic group or an alkyl group having 1 to 12 carbon atoms; and (iii) compounds different from both (i) and (ii) and having a melting point of at least 80° C. The crosslinking agent has a glass transition temperature of at least 10° C. and is essentially free of functional groups which are reactive with aminoplast resin. The present invention is also directed to a method for preparing the aforementioned crosslinking agent. The method comprises the steps of (1) combining the reactants (a), (b), and (c) described above to form a reaction admixture; (2) heating the reaction admixture formed in step (1) to a temperature ranging from 90° C. to 135° C.; and (3) maintaining the temperature achieved in step (2) for a time sufficient to produce an ungelled reaction product having a glass transition temperature of at least 10° C. which is essentially free of functional groups reactive with aminoplast resin as determined by infrared spectroscopy.

Further provided is a curable powder coating composition comprising a solid particulate film-forming mixture of (1) a polymer containing reactive functional groups and having a $T_g$ of at least 30° C. and (2) the crosslinking agent described above.

Also provided is a multi-layer composite coating composition comprising a base coat deposited from a base coating film forming composition and a top coat over at least a portion of the base coat. The top coat is deposited from the aforedescribed curable powder coating composition. Coated substrates are also provided.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As aforementioned, the crosslinking agent of the present invention comprises the ungelled reaction product of (a) at least one aminoplast resin; (b) at least one polyfunctional polymer comprising functional groups reactive with the aminoplast resin (a) and having a glass transition temperature of at least 15° C.; and (c) at least one compound different from (b) having active hydrogen groups reactive with aminoplast resin (a). The compound (c) is selected from at least one of (i) compounds having the structure (I) above where X, $R^1$, $R^2$, and $R^3$ are as described above for that structure, and (ii) compounds having the structure (II) or (III) above where R', R" are as described above for that structure, and (iii) compounds different from (i) and (ii) and having a melting point of at least 80° C. The crosslinking agent is essentially free of functional groups which are reactive with aminoplast resin and has a $T_g$ of at least 10° C.

By "ungelled" is meant that the reaction product has an intrinsic viscosity when dissolved in a suitable solvent. The intrinsic viscosity of the reaction product is an indication of its molecular weight. A gelled reaction product, on the other hand, since it is of essentially infinitely high molecular weight, will have an intrinsic viscosity too high to measure. Moreover, the reaction product can be melted, solidified and remelted.

The aminoplast resins suitable for use in the preparation of the crosslinking agent of the present invention include those which are or are derived from at least one of glycoluril, aminotriazine and benzoguanamine. Such compounds include, for example, alkoxyalkyl derivatives of melamine, glycoluril, benzoguanamine, acetoguanamine, formoguanamine, spiroguanamine and the like.

In one embodiment of the present invention, the aminoplast resin (a) comprises a compound derived from glycoluril, such as alkoxylated aldehyde condensates of glycoluril. The alkoxylated aldehyde condensates of glycoluril suitable for use as the aminoplast resin (a) can be prepared by reacting glycoluril, or acetylene diurea, with an aldehyde, most often formaldehyde, to form tetra-alkylol glycoluril. In this embodiment, the alkylol groups typically are etherified with a mono-alcohol, such as a $C_1$ to $C_6$ mono-alcohol, to form tetra-alkoxy alkyl glycoluril. A suitable, nonlimiting example of such a tetra-alkoxyalkyl glycoluril is tetra-methoxy methyl glycoluril which is commercially available under the tradename POWDERLINK® 1174 from Cytec Industries, Inc.

Aminoplast resins generally are based on the condensation products of formaldehyde, with an amino- or amido-group carrying substance. Condensation products obtained from the reaction of alcohols and formaldehyde with melamine, urea or benzoguanamine are most common. However, condensation products of other amines and amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine and 3,4,6-tris(ethylamino)-1,3,5 triazine.

While the aldehyde employed is most often formaldehyde, other similar condensation products can be made from other aldehydes, such as acetaldehyde, crotonaldehyde, acrolein, benzaldehyde, furfural and glyoxal.

The aminoplast resins typically contain methylol or other alkylol groups, and, in most instances, at least a portion of these alkylol groups are etherified by a reaction with an alcohol. Any monohydric alcohol can be employed for this purpose, including such alcohols as methanol, ethanol, propanol, butanol, pentanol, hexanol, cyclohexanol, heptanol and others, as well as, benzyl alcohol and other aromatic alcohols, cyclic alcohols such as cyclohexanol, monoethers of glycols, and halogen-substituted or other substituted alcohols, such as 3-chloropropanol and butoxyethanol. Commonly employed aminoplast resins are substantially alkylated with methanol or butanol.

In another embodiment of the present invention, the aminoplast resins comprise highly alkylated, low imino aminoplast resins which have a degree of polymerization ("DP") of less than 2.0, often less than 1.8, and typically less than 1.5. Generally, the number average degree of polymerization is defined as the average number of structural units per polymer chain (see George Odian, *Principles of Polymerization*, John Wiley & Sons (1991)). For purposes of the present invention, a DP of 1.0 would indicate a completely monomeric triazine structure, while a DP of 2.0 indicates two triazine rings joined by a methylene or methylene-oxy bridge. It should be understood that the DP values reported herein and in the claims represent average DP values as determined by gel permeation chromatography data.

Non-limiting examples of suitable aminotriazine compounds include alkoxyalkyl aminotriazines, such as (methoxymethyl)melamine-formaldehyde resin, for example CYMEL® 300; ethylated-methylated benzoguanamine-formaldehyde resin, for example CYMEL® 1123; and methylated-butylated melamine-formaldehyde resin, for example CYMEL® 1135, all of which are commercially available from Cytec Industries, Inc.

Mixtures of the previously described aminoplast resins can be used.

The polyfunctional polymer (b) used to prepare the crosslinking agent of the present invention can comprise any of a variety of polymers having functional groups reactive with the aminoplast resin (a). Typically the polyfunctional polymer (b) comprises a polymer selected from at least one of polyester polymers, polycarbonate polymers, acrylic polymers, polyether polymers and mixtures thereof.

The $T_g$ of the polyfunctional polymer (b) used to prepare the crosslinking agent of the present invention can be at least 15° C., usually at least 25° C., typically at least 35° C. The $T_g$ of the polyfunctional polymer (b) also can be less than 130° C., usually less than 110° C., typically less than 90° C. The $T_g$ of the functional group-containing polymer (b) can range between any combination of these values inclusive of the recited values. The $T_g$ can be measured experimentally using differential scanning calorimetry (rate of heating 10° C. per minute, $T_g$ taken at the first inflection point). Unless otherwise indicated, the stated $T_g$ as used herein refers to the measured $T_g$.

Also, as used herein, the term "polymer" is meant to refer to oligomers and both homopolymers and copolymers. Unless stated otherwise, as used in the specification and the claims, molecular weights are number average molecular weights for polymeric materials indicated as "Mn" and obtained by gel permeation chromatography using a polystyrene standard in an art-recognized manner.

The polyfunctional polymer (b) can comprise reactive functional groups selected from hydroxyl, carboxylic acid, amine, amide, thiol, urea, carbamate, thiocarbamate, oxazoline, thiooxazoline, oxazolidone, oxazolidinone and mixtures thereof. In one embodiment of the present invention, the polyfunctional polymer (b) comprises hydroxyl groups. Hydroxyl functional group-containing polyester polymers typically are employed.

Suitable functional group-containing acrylic polymers include copolymers prepared from one or more alkyl esters of acrylic acid or methacrylic acid and, optionally, one or more other polymerizable ethylenically unsaturated monomers. Suitable alkyl esters of acrylic or methacrylic acid include methyl (meth)acrylate, ethyl (meth)acrylate, butyl (meth)acrylate, and 2-ethylhexyl (meth)acrylate. As used herein, by "(meth)acrylate" and like terms is meant both methacrylates and acrylates. Suitable other polymerizable ethylenically unsaturated monomers include vinyl aromatic compounds, such as styrene and vinyl toluene; nitriles, such as acrylonitrile and methacrylonitrile; vinyl and vinylidene halides, such as vinyl chloride and vinylidene fluoride and vinyl esters, such as vinyl acetate; epoxy functional acrylates such as glycidyl (meth)acrylate.

In one embodiment, the acrylic polymers contain hydroxyl functionality which can be incorporated into the acrylic polymer through the use of hydroxyl functional monomers such as hydroxyethyl (meth)acrylate and hydroxypropyl (meth)acrylate which may be copolymerized with the other acrylic monomers.

The acrylic polymer can be prepared from ethylenically unsaturated, beta-hydroxy ester functional monomers. Such monomers are derived from the reaction of an ethylenically unsaturated acid functional monomer, such as monocarboxylic acids, for example, acrylic acid, and an epoxy compound which does not participate in the free radical initiated polymerization with the unsaturated acid monomer. Examples of such epoxy compounds are glycidyl ethers and esters. Suitable glycidyl ethers include glycidyl ethers of alcohols and phenols, such as butyl glycidyl ether, octyl glycidyl ether, phenyl glycidyl ether and the like. Suitable glycidyl esters include those which are commercially available from Shell Chemical Company under the tradename CARDURA E; and from Exxon Chemical Company under the tradename GLYDEXX-10.

Alternatively, the beta-hydroxy ester functional monomers are prepared from an ethylenically unsaturated, epoxy functional monomer, for example glycidyl (meth)acrylate and allyl glycidyl ether, and a saturated carboxylic acid, such as a saturated monocarboxylic acid, for example, isostearic acid.

The hydroxyl group-containing acrylic polymers useful as the polyfunctional polymer (b) in the powder coating compositions of the present invention typically have a hydroxyl value ranging from 65 to 200, preferably from 90 to 180, and more preferably from 130 to 170.

The acrylic polymer is typically prepared by solution polymerization techniques in the presence of suitable initiators such as organic peroxides or azo compounds, for example, benzoyl peroxide or N,N-azobis (isobutyronitrile). The polymerization can be carried out in an organic solution in which the monomers are soluble by techniques conventional in the art.

Pendent and/or terminal carbamate functional groups can be incorporated into the acrylic polymer by copolymerizing the acrylic monomer with a carbamate functional vinyl monomer, such as a carbamate functional alkyl ester of methacrylic acid. These carbamate functional alkyl esters are prepared by reacting, for example, a hydroxyalkyl carbamate, such as the reaction product of ammonia and ethylene carbonate or propylene carbonate, with methacrylic anhydride. Other carbamate functional vinyl monomers may be used, such as the reaction product of isocyanic acid (HNCO) with a hydroxyl functional acrylic or methacrylic monomer such as hydroxyethyl acrylate, and those carbamate functional vinyl monomers described in U.S. Pat. No. 3,479,328.

Carbamate groups can also be incorporated into the acrylic polymer by a "transcarbamoylation" reaction in which a hydroxyl functional acrylic polymer is reacted with a low molecular weight carbamate derived from an alcohol or a glycol ether. The carbamate groups exchange with the hydroxyl groups yielding the carbamate functional acrylic polymer and the original alcohol or glycol ether.

The low molecular weight carbamate functional material derived from an alcohol or glycol ether is first prepared by reacting the alcohol or glycol ether with urea in the presence of a catalyst such as butyl stannoic acid. Suitable alcohols include lower molecular weight aliphatic, cycloaliphatic and aromatic alcohols, such as methanol, ethanol, propanol, butanol, cyclohexanol, 2-ethylhexanol and 3-methylbutanol. Suitable glycol ethers include ethylene glycol methyl ether and propylene glycol methyl ether. Propylene glycol methyl ether is preferred.

Also, hydroxyl functional acrylic polymers can be reacted with isocyanic acid yielding pendent carbamate groups. Note that the production of isocyanic acid is disclosed in U.S. Pat. No. 4,364,913. Likewise, hydroxyl functional acrylic polymers can be reacted with urea to give an acrylic polymer with pendent carbamate groups.

Epoxide functional acrylic polymers are typically prepared by polymerizing one or more epoxide functional ethylenically unsaturated monomers, e.g., glycidyl (meth) acrylate, with one or more ethylenically unsaturated monomers that are free of epoxide functionality, e.g., methyl (meth)acrylate, isobornyl (meth)acrylate, butyl (meth) acrylate and styrene. Examples of epoxide functional ethylenically unsaturated monomers that may be used in the preparation of epoxide functional acrylic polymers include, but are not limited to, glycidyl (meth)acrylate, 3,4-epoxycyclohexylmethyl (meth)acrylate, 2-(3,4-epoxycyclohexyl)ethyl (meth)acrylate and allyl glycidyl ether. Examples of ethylenically unsaturated monomers that are free of epoxide functionality include those described above as well as those described in U.S. Pat. No. 5,407,707 at column 2, lines 17 through 56, which disclosure is incorporated herein by reference.

The functional group-containing acrylic polymer generally has an Mn ranging from 400 to 3000 and typically from 500 to 2000. If carbamate functional, the acrylic polymer generally has a calculated carbamate equivalent weight within the range of 15 to 150, and typically less than 50, based on equivalents of reactive carbamate groups.

Non-limiting examples of functional group-containing polyester polymers suitable for use as the polyfunctional polymer (b) in the curable powder coating compositions of the present invention include linear or branched polyesters having hydroxyl and/or carbamate functionality. Such polyester polymers are generally prepared by the polyesterification of a polycarboxylic acid or anhydride thereof with polyols and/or an epoxide using techniques known to those skilled in the art. Usually, the polycarboxylic acids and polyols are aliphatic or aromatic dibasic acids and diols. Transesterification of polycarboxylic acid esters using conventional techniques is also possible.

The polyols which usually are employed in making the polyester include alkylene glycols, such as ethylene glycol and other diols, such as neopentyl glycol, hydrogenated Bisphenol A, cyclohexanediol, butyl ethyl propane diol, trimethyl pentane diol, cyclohexanedimethanol, caprolactonediol, for example, the reaction product of epsilon-caprolactone and ethylene glycol, hydroxyalkylated bisphenols, polyether glycols, for example, poly (oxytetramethylene) glycol and the like. Polyols of higher functionality may also be used. Examples include trimethylolpropane, trimethylolethane, pentaerythritol, tris-hydroxyethylisocyanurate and the like. Branched polyols, such as trimethylolpropane and tris-hydroxyethylisocyanurate, are preferred for use in the preparation of the polyester.

The acid component used to prepare the polyester polymer can include, primarily, monomeric carboxylic acids or anhydrides thereof having 2 to 18 carbon atoms per molecule. Among the acids which are useful are cycloaliphatic acids and anhydrides, such as phthalic acid, isophthalic acid, terephthalic acid, tetrahydrophthalic acid, hexahydrophthalic acid, methylhexahydrophthalic acid, 1,3-cyclohexane dicarboxylic acid and 1,4-cyclohexane dicarboxylic acid. Other suitable acids include adipic acid, azelaic acid, sebacic acid, maleic acid, glutaric acid, decanoic diacid, dodecanoic diacid and other dicarboxylic acids of various types. The polyester may include minor amounts of monobasic acids such as benzoic acid, stearic acid, acetic acid and oleic acid. Also, there may be employed higher carboxylic acids, such as trimellitic acid and tricarballylic acid. Where acids are referred to above, it is understood that anhydrides thereof which exist may be used in place of the acid. Also, lower alkyl esters of diacids such as dimethyl glutarate and dimethyl terephthalate can be used.

Pendent and/or terminal carbamate functional groups may be incorporated into the polyester by first forming a hydroxyalkyl carbamate which can be reacted with the polyacids and polyols used in forming the polyester. The hydroxyalkyl carbamate is condensed with acid functionality on the polyester yielding carbamate functionality. Carbamate functional groups may also be incorporated into the polyester by reacting a hydroxyl functional polyester with a low molecular weight carbamate functional material via a transcarbamoylation process similar to the one described above in connection with the incorporation of carbamate groups into the acrylic polymers or by reacting isocyanic acid with a hydroxyl functional polyester.

The functional group-containing polyester polymers described above typically have an Mn ranging from 400 to 3000, usually about 500 to 2000. If carbamate functional, the polyester polymer typically has a calculated carbamate equivalent weight within the range of 15 to 150, usually 20 to 75, based on equivalents of reactive pendent or terminal carbamate groups.

In one embodiment, the polyfunctional polymer (b) comprises a polyester polyol which comprises the condensation reaction product of (i) a cycloaliphatic polyol and (ii) a cyclic polycarboxylic acid or anhydride.

The cycloaliphatic polyol (i) can be any of a variety of polyhydric cycloaliphatic compounds well known in the art. Suitable examples of cycloaliphatic polyols include those selected from the group consisting of hydrogenated Bisphenol A, hydrogenated Bisphenol F, hydrogenated Bisphenol E, M, P, Z, and the like cyclohexyl dimethanol, cyclohexane diol and mixtures thereof. Hydrogenated Bisphenol A is most often employed.

The cyclic polycarboxylic acid or anhydride (ii) can be any cyclic compound having two or more carboxylic acid groups per molecule. Preferably, the cyclic polycarboxylic acid/anhydride (ii) is selected from the group consisting of hexahydrophthalic acid; phthalic acid, isophthalic acid, terephthalic acid, anhydrides thereof, and mixtures thereof. In one particular embodiment of the present invention, hexahydrophthalic anhydride is employed.

The polyester polyol described immediately above can be prepared by general condensation reaction techniques well-known in the art so long as the ratio of reactants (i) and (ii) and reaction conditions are such that the resulting condensation reaction product comprises two or more reactive hydroxyl groups per molecule. For purposes of the present invention, the molar ratio of the cycloaliphatic polyol (i) to the cyclic polycarboxylic acid or anhydride (ii) can range from 1.0 to 2.5:1, often from 1.5 to 2.2:1, and typically from 1.8 to 2.2:1.

The polyester polyol can be prepared generally as follows. The acid/anhydride and alcohol(s) are reacted using condensation techniques well-known to the art while collecting distillate. The reaction is monitored by periodic sampling for acid value and hydroxyl number measurements. The reaction is terminated when these parameters meet preset requirements. The polyester polyol described immediately above can have a Mn ranging from 400 to 2000, often from 400 to 1500, and typically from 400 to 1000. Also, the hydroxyl value of the polyester polyol can be greater than 130, most often ranges from 130 to 190, and typically from 140 to 175.

Further, the polyester polyol typically has a glass transition temperature of at least 30° C., often at least 35° C., and typically at least 40° C. Also, the polyester polyol generally has a glass transition temperature less than 120° C., usually less than 110° C., and typically less than 100° C. The $T_g$ of the polyester polyol (a) can range between any combination of these values inclusive of the recited values.

Functional group-containing polyether polymers can also be used in the curable powder coating compositions of the present invention. Suitable hydroxyl and/or carbamate functional polyether polymers can be prepared by reacting a polyether polyol with urea under reaction conditions well known to those skilled in the art. More preferably, the polyether polymer is prepared by a transcarbamoylation reaction similar to the reaction described above in connection with the incorporation of carbamate groups into the acrylic polymers.

Examples of polyether polyols are polyalkylene ether polyols which include those having the following structural formulae (IV) and (V):

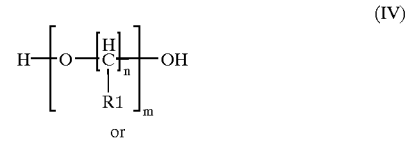

(IV)

or

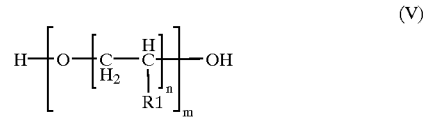

(V)

where the substituent $R_1$ is hydrogen or lower alkyl containing from 1 to 5 carbon atoms including mixed substituents, n is typically from 2 to 6, and m is from 2 to 100 or higher. Note that the hydroxyl groups, as shown in structures (II) and (III) above, are terminal to the molecules. Included are poly(oxytetramethylene) glycols, poly(oxytetraethylene) glycols, poly(oxy-1,2-propylene) glycols and poly(oxy-1,2-butylene) glycols.

Also useful are polyether polyols formed from oxyalkylation of various polyols, for example, diols, such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds, such as sucrose or sorbitol. One commonly utilized oxyalkylation method is reaction of a polyol with an alkylene oxide, for example, propylene or ethylene oxide, in the presence of a conventional acidic or basic catalyst as known to those skilled in the art. Typical oxyalkylation reaction conditions may be employed. Suitable polyethers can include those sold under the tradenames TERATHANE® and TERACOL®, available from E. I. Du Pont de Nemours and Company, Inc. and POLYMEG®, available from Q O Chemicals, Inc., a subsidiary of Great Lakes Chemical Corp.

Suitable functional group-containing polyether polymers can have a number average molecular weight (Mn) ranging from 400 to 3000 and typically from 500 to 2000. If carbamate functional, the polyether polymers can have a carbamate equivalent weight of within the range of 15 to 150, typically 25 to 75, based on equivalents of reactive pendent and/or terminal carbamate groups and the solids of the polyether polymer.

As aforementioned, the preferred carbamate functional group-containing polymers typically also contain residual hydroxyl functional groups which provide additional crosslinking sites. The hydroxyl/carbamate functional group-containing polymer can have a residual hydroxyl value ranging from 1 to 10, often from 0.2 to 10; and typically from 0.5 to 10 (mg of KOH per gram).

Suitable polycarbonate polymers for use as polyfunctional polymer (b) can be prepared, for example, from carbon dioxide and 1,2-epoxides, such as ethylene oxide and propylene oxide; cyclic carbonates such as ethylene carbonate, or from cyclic carbonates and a 1,2-epoxide, typically in the presence of a small amount of a polyol initiator. The reaction is usually carried out under pressure in the presence of a metal carbonate, metal hydroxide, trisodium phosphate or a tertiary amine. Suitable non-limiting examples of such polycarbonate resins are described in U.S. Pat. No. 4,692,383.

As aforementioned, in addition to the aminoplast resin (a) and the polyfunctional polymer (b) described immediately above, the reactants used to form the crosslinking agent of the present invention further comprise (c) at least one compound different from (b) having active hydrogen groups reactive with aminoplast resin (a). As previously discussed, compound (c) is selected from at least one of (i) compounds having the following structure (I):

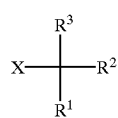

(I)

wherein X is aromatic; $R^1$, $R^2$, and $R^3$ can be the same or different and each independently represents H, (cyclo)alkyl having from 1 to 12 carbon atoms, aryl, alkaryl, aralkyl, or an active hydrogen-containing group which is reactive with the aminoplast resin (a), provided that at least one of $R^1$, $R^2$, and $R^3$ represents an active hydrogen-containing group which is reactive with the aminoplast resin (a); (ii) compounds having the following structure (II or III):

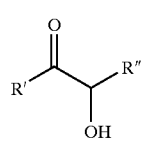

(II)

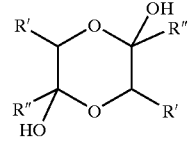

(III)

where R' and R" are the same or different and each independently represents an aromatic group or an alkyl group having 1 to 12 carbon atoms; and (iii) compounds different from both (i) and (ii) and having a melting point of at least 80° C. Mixtures of any combination of compounds (C)(i), (C)(ii), and (C) (iii) can be used. As used herein, by "(cyclo)alkyl" is meant both alkyl and cycloalkyl groups.

In one embodiment of the present invention, compound (c) comprises at least one of compound (i) having the previously described structure (I). As aforementioned, the substituent group X represents an aromatic, for example, phenyl, and substituted phenyl groups. These groups can be any fused or bridged ring structures such as naphthyl, anthracyl, and benzofuranyl. Also, the aromatic groups can be unsubstituted or substituted with heteroatoms, for example O, N and S. Non-limiting examples of aromatic groups suitable as the substituent include phenyl, naphthyl, anthracyl, pyrene, benzofuranyl, and the like.

As previously mentioned, at least one of $R^1$, $R^2$, and $R^3$ represents a group comprising an active hydrogen-containing group reactive with the aminoplast resin (a), such as a group selected from hydroxyl, amide, amine, carboxylic acid, carbamate, urea, thiol, and combinations thereof. In one embodiment of the present invention, compound (c) comprises at least one compound having the structure (I) above wherein at least one of $R^1$, $R^2$, and $R^3$ represents a group comprising at least one hydroxyl group. Nonlimiting examples of active hydrogen-containing compounds suitable for use as the reactant (c)(i) include benzyl alcohol and substituted benzyl alcohols such as 3-phenoxybenzyl alcohol and 4-methoxybenzyl alcohol, phenethyl alcohol, benzopinacol, N-benzylformamide, benzyl lactate, benzyl mandelate, benzyl mercaptan, N-benzylmethamine, 3-furanmethanol, furfuryl alcohol, pyridylcarbinols, for example, 2-pyridylcarbinol, and 3-pyridylcarbinol, 1-pyrenemethanol, 9-anthrancenemethanol, 9-fluorenemethanol, 9-hydroxyfluorene, 9-hydroxyxanthene, 9-phenylxanthen-9-ol, 4-stilbenemethanol and triphenylmethanol.

In another embodiment of the present invention, the active hydrogen containing compound (c) (ii) comprises compounds having the following structure (II):

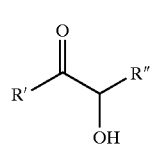

(II)

or dimer derivatives thereof as discussed below, where R' and R" are the same or different and each independently represents an aromatic group or an alkyl group having 1 to 12 carbon atoms. In one embodiment of the present invention, one or both of the substituent groups R' and R" are aromatic groups, for example phenyl, naphthyl, methoxy phenyl, and dimethylaminophenyl groups.

Also, suitable aromatic groups can contain one or more heteroatoms, such as O, N and S, either internal or external to the aromatic ring. The heteroatoms external to the ring may be attached directly to the ring or indirectly through one or more carbon atoms. One or more heteroatoms may be present in each such substituent and one or more substituents may be attached to the aromatic ring. The heteroatom containing substituent group(s) may be attached to the aromatic ring in any position or combination of positions on the ring. Suitable heteroatomic substituent groups include but are not limited to amines, ethers, esters, ketones, amides, halides, sulfonamides, nitro and carboxylic acid groups. Heteroatoms internal to the aromatic ring may be present in any position or combination of positions. For example, such heteroaromatic groups can include but are not limited to furans, pyridines, thiophenes, triazines, imidazoles, oxazoles, thiazoles, pyrazoles and triazoles. Non-limiting examples of such compounds include anisoin, pyridoin, furoin, is bufyroin.

In one particular embodiment of the present invention, the active hydrogen-containing compound (c)(ii) comprises an active hydrogen-containing compound selected from benzoin, hydroxycyclohexyl phenylketone, and mixtures thereof.

Compounds having the general structure (II) above are known to form dimeric derivatives, particularly when R' and R" are alkyl (Merck Index, 11ed, p 10, 55).

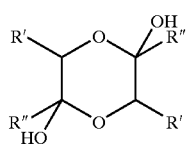

(III)

Such dimer derivatives can have the structure (III) above where R' and R" are as described above for the structure (II).

In yet another embodiment of the present invention, the active hydrogen-containing compound (c) comprises at least one of compound (iii), which is different from both (i) and (ii), having a melting point of at least 80° C. The melting point of a compound can be determined by using a standard capillary melting point apparatus or by thermal analysis (ASTM E974-95).

Generally, the melting point of the active hydrogen containing compound (c)(iii) is less than 250° C., usually less than 220° C., and typically less than 200° C. Also, the melting point of the active hydrogen containing compound (c)(iii) generally is at least 80° C., usually at least 90° C., and typically at least 100° C. The melting point of the active hydrogen containing compound (c)(iii) can range between any combination of these values inclusive of the recited values. Nonlimiting examples of compounds suitable for use as reactant (c)(iii) include mono-alcohols such as borneol, norborneol, isoborneol, 1-adamantanemethanol, 1-adamantanol, 2-methyl-2-adamantanol and 5-norbornen-2-ol; secondary amides, such as aliphatic cyclic amides such as 1-methylhydantoin, 2,4-thiazolidinedione, 2-azacyclotridecanone, 3,4,5,6,7,8-hexahydro-2(1H)-quinoline, 4-azatricyclo(4.3.1.1(3,8))undecan-5-one and 4-methoxy-3-pyrrolin-2-one; aliphatic open chain amides, such as N-(1-adamantyl)acetamide) and N-tert-butylacrylamide; aromatic (poly)cyclic amides, including lactams, such as 1-acetamidopyrene, 2-acetamide-3-nitro-9-fluorenone, 2-acetoamide-7-fluorfluorene, 2-acetamidofluorene, 4-acetamido-9-fluorenone, naphthol AS acetate, 1-phenyl-3-pyrazolidinone, 2,3-dimethyl-1-(4-methylphenyl)-3-pyrazolin-5-one, 3,4-dimethyl-1-phenyl-3-pyrazolin-5-one, 3-(4-ethoxyphenyl)-1-(2-nitrophenyl)-hydantoin, 4-acetamidoantipyrine, and 4-acetamidobenzaldehyde; aromatic open chain amides, such as 3-acetamidocoumarin and p-acetophenetidide; and mono-urethanes such as those obtained by reacting high melting point mono-alcohols (such as those described immediately above) with suitable mono-isocyanates.

The active hydrogen-containing compound (c) can comprise one or more of compounds, (c)(i), (c)(ii), and (c)(iii). Inclusion of the active hydrogen-containing compound (c) as a reactant in the preparation of the crosslinking agent of the present invention can provide several advantages. First, reaction of the active hydrogen-containing compound (c) with the aminoplast resin (a) can generally increase the $T_g$ of the resultant crosslinker as compared to an analogous crosslinking agent having no such modification. Also, compounds such as compounds (c)(i), (c)(ii), and (c)(iii) described above can allow for the reaction of more alkoxy groups of the aminoplast resin (a) without resulting in a gelled reaction product. Such a crosslinking agent when incorporated into curable powder coating compositions can effect less gassing upon curing. Furthermore, when crosslinking agents of the present invention are used in curable powder coating compositions, the degassing agent may be released in situ. This can reduce adverse effects, for example, yellowing of the film, which can be caused by the presence of the degassing agent during curing processes.

The present invention is also directed to a method for preparing the above-described crosslinking agent. The aminoplast resin (a), the polyfunctional polymer (b), and the active hydrogen-group containing compound (c) are combined in a suitably equipped reaction vessel, typically with a suitable solvent and an appropriate strong acid as catalyst. Any suitable solvent can be used, with aromatic solvents most often being employed. Non-limiting examples of suitable aromatic solvents can include xylene, toluene, and mixtures of these solvents. Non-limiting examples of strong acids suitable for use as a catalyst include, but are not limited to, para-toluene sulfonic acid, dodecyl benzene sulfonic acid and dodecyl benzene disulfonic acid. Normal condensation techniques as are well-known in the art can be used. The reaction admixture is heated to a temperature ranging from 90° to 135° C., usually from 100° C. to 130° C., and the admixture is held at that temperature for a period sufficient to obtain an ungelled product having a $T_g$ of at least 10° C. The reaction is terminated when a pre-determined end point (e.g., the disappearance of the OH signal) is detected by infrared spectroscopy or other suitable analytical technique.

In the preparation of the crosslinking agent of the present invention, aminoplast resin (a), polyfunctional polymer (b), and active hydrogen-group containing compound (c) are combined in a ratio such that the equivalents of aminoplast resin (b) are in excess relative to those of reactants (b) and (c) combined. This results in a stable crosslinking agent which is essentially free of functionality reactive with aminoplast resin. The reaction is monitored for the disappearance of such functionality relative to an internal standard (i.e., the signal of a constant structure which will remain unchanged during the reaction, for example, the carbonyl signal) via infrared spectroscopy or other suitable analytical technique.

The aminoplast resin (a) generally constitutes 90 weight percent or less, often 85 weight percent or less, and typically 80 weight percent or less of the reaction mixture, based on the total combined weight of reactants (a), (b), and (c). Also, the aminoplast resin (a) generally constitutes at least 45 weight percent, often at least 55 weight percent, and typically at least 65 weight percent of the reaction mixture, based on the total combined weight of reactants (a), (b), and (c). The percent by weight of the aminoplast resin (a) present in the reaction mixture can range between any combination of these values inclusive of the recited values.

The polyfunctional polymer (b) generally constitutes 45 weight percent or less, often 40 weight percent or less, and typically 30 weight percent or less of the reaction mixture, based on the total combined weight of reactants (a), (b), and (c). Also, the polyfunctional polymer (b) generally constitutes at least 10 weight percent, often at least 15 weight percent, and typically at least 20 weight percent of the reaction mixture, based on the total combined weight of the reactants (a), (b), and (c). The percent by weight of the polyfunctional polymer (b) present in the reaction mixture can range between any combination of these values inclusive of the recited values.

The active hydrogen containing compound (c) generally constitutes 45 weight percent or less, often 40 weight percent or less, and typically 35 weight percent or less of the reaction mixture, based on the total combined weight of reactants (a), (b), and (c). Also, the active hydrogen group-containing compound (c) generally constitutes at least 2 weight percent, often at least 5 weight percent, and typically at least 8 weight percent of the reaction mixture, based on the total combined weight of reactants (a), (b), and (c). The percent by weight of the active hydrogen-containing compound (c) present in the reaction mixture can range between any combination of these values inclusive of the recited values.

The crosslinking agent of the present invention generally has a glass transition temperature of at least 10° C., often at least 15° C., typically at least 20° C., and usually at least 25° C. Also, the crosslinking agent generally has a glass transition temperature less than 100° C., often less than 90° C., typically less than 85° C., and usually less than 80° C. The glass transition temperature of the crosslinking agent can range between any combination of these values, inclusive of the recited values. As mentioned above, the present invention also relates to a curable powder coating composition comprising a solid particulate, film-forming mixture of (1) a polymer containing reactive functional groups, and (2) the crosslinking agent described in detail above.

Curable powder coatings are particulate compositions that are solid and free flowing at ambient room temperature. As mentioned above, the curable powder coating compositions of the present invention comprise, as a first component (1), at least one reactive functional group-containing polymer having a glass transition temperature of at least 30° C., e.g., a hydroxyl and/or an epoxide functional acrylic polymer, and as a second component (2), the crosslinking agent described above. The components (1) and (2) of the curable powder coating composition may each independently comprise one or more functional species, and are each present in amounts sufficient to provide cured coatings having a desirable combination of physical properties, e.g., smoothness, optical clarity, scratch resistance, solvent resistance and hardness.

As used herein, the term "reactive" refers to a functional group that forms a covalent bond with another functional group under suitable reaction conditions. As used herein, the term "cure" as used in connection with a composition, e.g., "a curable composition," shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the glass transition temperature and crosslink density of free films of coatings or polymers. These physical properties of a cured material are related to the structure of the crosslinked network.

According to this method, the length, width, and thickness of a sample to be analyzed are first measured, the sample is tightly mounted to the Polymer Laboratories MK III apparatus, and the dimensional measurements are entered into the apparatus. A thermal scan is run at a heating rate of 3° C./min, a frequency of 1 Hz, a strain of 120%, and a static force of 0.01N, and sample measurements occur every two seconds. The mode of deformation, glass transition temperature, and crosslink density of the sample In can be determined according to this method. Higher crosslink density values indicate a higher degree of crosslinking in the coating.

The polymer (1) can be any of a variety of polymers having aminoplast-reactive functional groups as are well known in the art, so long as the $T_g$ of the polymer is sufficiently high to permit the formation of a stable, solid particulate composition. The $T_g$ of the polymer (1) generally is at least 30° C., often at least 40° C., and typically at least 50° C. The $T_g$ of the polymer (1) also generally is less than 130° C., often less than 100° C., and typically less than 80° C. The $T_g$ of the functional group-containing polymer (1) can range between any combination of these values inclusive of the recited values.

Also, as used herein, the term "polymer" is meant to refer to oligomers and both homopolymers and copolymers. Unless stated otherwise, as used in the specification and the claims, molecular weights are number average molecular weights for polymeric materials indicated as "Mn" and obtained by gel permeation chromatography using a polystyrene standard in an art-recognized manner.

Non-limiting examples of polymers having reactive functional groups useful in the curable powder coating compositions of the invention as the polymer (1) include those selected from the group consisting of acrylic, polyester, polyurethane, polyepoxide and polyether polymers such as those with functionalities described above with reference to the polyfunctional polymer (b). The polymer (1) preferably comprises reactive functional groups selected from hydroxyl, epoxy, carboxyl and/or carbamate functional groups or a combination thereof. In one embodiment of the present invention, the polymer (1) comprises hydroxyl and/or carbamate functional groups. In another embodiment of the invention, the polymer (1) comprises epoxy and/or hydroxyl functional groups.

The functional group-containing polymer (1) generally is present in the curable powder coating compositions of the present invention in an amount ranging from at least 5 percent by weight, often at least 20 percent by weight, typically at least 30 percent by weight, and usually at least 40 percent by weight based on the total weight of the powder coating composition. The functional group-containing polymer (1) also generally is present in the powder coating compositions of the present invention in an amount less than 95 percent by weight, often less than 90 percent by weight, typically less than 85 percent by weight, and usually less than 80 percent by weight based on the total weight of the powder coating composition. The amount of the functional group-containing polymer (1) present in the powder coating compositions of the present invention can range between any combination of these values inclusive of the recited values.

As mentioned above, the powder coating compositions of the present invention further comprise, as component (2), the crosslinking agent described above. The crosslinking agent (2) generally is present in the powder coating compositions of the present invention in an amount ranging from at least 5 percent by weight, often at least 10 percent by weight, typically at least 15 percent by weight, and usually at least 20 percent by weight based on the total weight of the powder coating composition. The crosslinking agent (2) also generally is present in the powder coating compositions of the present invention in an amount less than 95 percent by weight, often less than 80 percent by weight, typically less than 70 percent by weight, and usually less than 60 percent by weight based on the total weight of the powder coating composition. The amount of the crosslinking agent (2) present in the powder coating compositions of the present invention can range between any combination of these values inclusive of the recited values.

If desired, the powder coating compositions of the present invention can also include an adjuvant curing agent different from the crosslinking agent (2). The adjuvant curing agent can be any compound having functional groups reactive with the functional groups of the polymer (1) described above. Non-limiting examples of suitable adjuvant curing agents include blocked isocyanates, triazine compounds, glycoluril resins, and mixtures thereof.

The blocked isocyanates suitable for use as the adjuvant curing agent in the powder coating compositions of the invention are known compounds and can be obtained from commercial sources or may be prepared according to published procedures. Upon being heated to cure the powder coating compositions, the isocyanates are unblocked and the isocyanate groups become available to react with the functional groups of the polymer (1).

Any suitable aliphatic, cycloaliphatic or aromatic alkyl monoalcohol known to those skilled in the art can be used as a blocking agent for the isocyanate. Other suitable blocking agents include oximes and lactams. Non-limiting examples of suitable blocked isocyanate curing agents include those based on isophorone diisocyanate blocked with ε-caprolactam; toluene 2,4-toluene diisocyanate blocked with ε-caprolactam; or phenol-blocked hexamethylene diisocyanate. The blocked isocyanates mentioned immediately above are described in detail in U.S. Pat. No. 4,988,793 at column 3, lines 1 to 36. Preferred blocked isocyanate curing agents include BF-1530, which is the reaction product of epsilon-caprolactam blocked T1890, a trimerized isophorone diisocyanate ("IPDI") with an isocyanate equivalent weight of 280, and BF-1540, a uretidione of IPDI with an isocyanate equivalent weight of 280, all of which are available from Creanova of Somerset, N.J.

Conventional aminoplast crosslinkers can be used as the adjuvant curing agent provided that the $T_g$ of the coating is not lowered to an undesirable extent. Suitable adjuvant aminoplast resins can include aldehyde condensates of glycoluril, such as those described above. Glycoluril resins suitable for use as the adjuvant curing agent in the powder coating compositions of the invention can include POWDERLINK® 1174 commercially available from Cytec Industries, Inc. of Stamford, Conn.

When employed, the adjuvant curing agent generally is present in the powder coating compositions of the present invention in an amount ranging from 5 to 10 percent by weight, often from 5 to 20 percent by weight, typically from 5 to 30 percent by weight, and usually from 5 to 50 percent by weight based on the total weight of the powder coating composition.

Also suitable for use as an adjuvant curing agent in the powder coating compositions of the present invention are triazine compounds, such as the tricarbamoyl triazine compounds described in detail in U.S. Pat. No. 5,084,541. When used, the triazine curing agent is typically present in the powder coating composition of the present invention in an amount ranging up to about 20 percent by weight, and usually from about 1 to 20 percent by weight, percent by weight based on the total weight of the powder coating composition. Mixtures of the above-described curing agents also can be used advantageously.

Also, it should be understood that for purposes of the present invention, the curable powder coating compositions which contain epoxy group-containing polymers typically also include an epoxide-reactive curing (i.e., crosslinking) agent, usually an acid functional curing agent, in addition to the aminoplast-based crosslinking agent (2). A secondary hydroxyl group can be generated upon reaction of each epoxy functional group with a functional group of the epoxide-reactive curing agent. These secondary hydroxyl groups are then available for further reaction with the aminoplast-based crosslinking agent (2).

Epoxide-reactive curing agents which can be used in curable powder coating compositions comprising an epoxide functional polymer may have functional groups selected from the group consisting of hydroxyl, thiol, primary amines, secondary amines, acid (e.g. carboxylic acid) and mixtures thereof. Useful epoxide reactive curing agents having amine functionality include, for example, dicyandiamide and substituted dicyandiamides. Preferably, the epoxide reactive curing agent has carboxylic acid groups.

In one embodiment of the present invention, the epoxide reactive crosslinking agent has carboxylic acid functionality and is substantially crystalline. By "crystalline" is meant that the co-reactant contains at least some crystalline domains, and correspondingly may contain some amorphous domains. While not necessary, the epoxide reactive crosslinking agent can have a melt viscosity less than that of the epoxy functional polymer (at the same temperature). As used herein and in the claims, by "epoxide reactive crosslinking agent" is meant that the epoxide reactive crosslinking agent has at least one, typically two, functional groups that are reactive with epoxide functionality.

Typically, the epoxide reactive crosslinking agent is a carboxylic acid functional curing agent, which contains from 4 to 20 carbon atoms. Examples of carboxylic acid functional crosslinking agents useful in the present invention include, but are not limited to, dodecanedioic acid, azelaic acid, adipic acid, 1,6-hexanedioic acid, succinic acid, pimelic acid, sebasic acid, maleic acid, citric acid, itaconic acid, aconitic acid and mixtures thereof.

Other suitable carboxylic acid functional curing agents include those represented by the following general formula (VI),

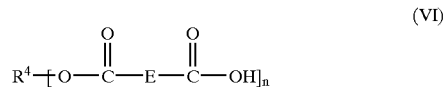

(VI)

In general formula (VI), $R^4$ is the residue of a polyol, E is a divalent linking group having from 1 to 10 carbon atoms, and n is an integer of from 2 to 10. Examples of polyols from which $R^4$ of general formula (VI) may be derived include, but are not limited to, ethylene glycol, di(ethylene glycol), trimethylolethane, trimethylolpropane, pentaerythritol, di-trimethylolpropane, di-pentaerythritol and mixtures thereof. Divalent linking groups from which E may be selected include, but are not limited to, methylene, ethylene, propylene, isopropylene, butylene, pentylene, hexylene, heptylene, octylene, nonylene, decylene, cyclohexylene, e.g., 1,2-cyclohexylene, substituted cyclohexylene, e.g., 4-methyl-1,2-cyclohexylene, phenylene, e.g., 1,2-phenylene, and substituted phenylene, e.g., 4-methyl-1,2-phenylene and 4-carboxylic acid-1,2-phenylene. The divalent linking group E is preferably aliphatic.

The curing agent represented by general formula (VI) typically is prepared from a polyol and a dibasic acid or cyclic anhydride. For example, trimethylol propane and hexahydro-4-methylphthalic anhydride are reacted together in a molar ratio of 1:3 respectively, to form a carboxylic acid functional curing agent. This particular curing agent can be described with reference to general formula (VI) as follows, $R^4$ is the residue of trimethylol propane, E is the divalent linking group 4-methyl-1,2-cyclohexylene, and n is 3. Carboxylic acid functional curing agents described herein with reference to general formula (VI) are meant to include also any unreacted starting materials and/or co-products, e.g., oligomeric species, resulting from their preparation and contained therein.

Curable powder coating compositions comprising an epoxide functional polymer and an epoxide-reactive curing agent can also include one or more cure catalysts for catalyzing the reaction between the reactive functional groups of the crosslinking agent and the epoxide groups of the polymer. Examples of cure catalysts for use with acid functional crosslinking agents include tertiary amines, e.g., methyl dicocoamine, and tin compounds, e.g., triphenyl tin hydroxide. When employed, the curing catalyst is typically present in the curable powder coating composition in an amount of less than 5 percent by weight, e.g., from 0.25 percent by weight to 2.0 percent by weight, based on total weight of the composition.

Curable powder coating compositions comprising epoxide functional polymers and epoxide-reactive curing agents typically contain both in a total amount ranging from 50 percent to 99 percent by weight, based on the total weight of the composition, e.g., from 70 percent to 85 percent by weight, based on the total weight of the composition. The epoxide reactive curing agent is typically present in the curable powder coating composition in an amount corresponding to a portion of these recited ranges, i.e., 5 to 40, particularly 15 to 30, percent by weight, based on the total weight of the composition. The equivalent ratio of epoxide equivalents in the epoxide functional polymer to the equivalents of reactive functional groups in the curing agent is typically from 0.5:1 to 2:1, e.g., from 0.8:1 to 1.5:1.

Curable powder coating compositions of the present invention comprising an epoxide functional polymer as component (1) and an epoxide reactive curing agent contain the crosslinking agent (2) in an amount ranging from 1 to 50 weight percent, usually from 2 to 40 weight percent and more typically from 15 to 30 weight percent based on total weight of the powder coating composition.

The powder coating compositions of the present invention can further include additives as are commonly known in the art. Typical additives include benzoin, used to reduce entrapped air or volatiles; flow aids or flow control agents which aid in the formation of a smooth and/or glossy surface, for example, MODAFLOW® available from Monsanto Chemical Co., waxes such as MICROWAX® C available from Hoechst, fillers such as calcium carbonate, barium sulfate and the like; pigments and dyes as colorants; UV light stabilizers such as TINUVIN® 123 or TINUVIN® 900 available from CIBA Specialty Chemicals and catalysts to promote the various crosslinking reactions.

Such additives are typically present in the powder coating compositions of the present invention in an amount ranging from 1 to 20 weight percent based on total weight of the powder coating composition.

The powder coating compositions of the invention are typically prepared by blending the functional group-containing polymer (1) and the crosslinking agent (2) for approximately 1 minute in a Henschel blade blender. The mixture is then usually catalyzed and extruded through a Baker-Perkins twin screw extruder at a temperature ranging from 158° F. to 266° F. (70° C. to 130° C.). The resultant chip is usually ground and classified to an appropriate particle size, typically between 20 and 200 microns, in a cyclone grinder/sifter.

The curable powder coating compositions of the invention can be applied to a variety of substrates including metallic substrates, for example, aluminum and steel substrates, and non-metallic substrates, for example, thermoplastic or thermoset composite substrates. The powder coating compositions are typically applied by spraying, and in the case of a metal substrate, by electrostatic spraying which is preferred, or by the use of a fluidized bed. The powder coating can be applied in a single sweep or in several passes to provide a film having a thickness after cure of from about 1 to 10 mils (25 to 250 micrometers), usually about 2 to 4 mils (50 to 100 micrometers).

Generally, after application of the powder coating composition, the powder coated substrate is heated to a temperature sufficient to cure the coating, typically to a temperature ranging from 250° F. to 500° F. (121.1° C. to 260.0° C.) for 1 to 60 minutes, and preferably from 300° F. to 400° F. (148.9° C. to 204.4° C.) for 15 to 30 minutes.

The curable powder coating composition can be applied as a primer or primer surfacer, or as a top coat, for example, a "monocoat". In one embodiment, the present invention is directed to a curable powder coating composition which is advantageously employed as a top coat in a multi-layer composite coating composition. Such a multi-layer composite coating composition generally comprises a base coat which is deposited from a film-forming base coating composition (typically pigmented) and a top coat applied over the base coat, the top coat being deposited from the curable powder coating composition of the present invention as described above. In one particular embodiment, the multi-component composite coating composition is a color-plus-clear system where the top coat is deposited from a powder coating composition which is substantially pigment-free, i.e., a clear coat.

The film-forming composition from which the base coat is deposited can be any of the compositions useful in coatings applications, for example, in automotive applications where color-plus-clear systems are most often used. A film-forming composition conventionally comprises a resinous binder and a pigment to serve as a colorant. Particularly useful resinous binders include acrylic polymers, polyester polymers including alkyds, and polyurethane polymers.

The resinous binders for the base coat can be organic solvent-based materials, such as those described in U.S. Pat. No. 4,220,679. Water-based coating compositions, such as those described in U.S. Pat. Nos. 4,403,003; 4,147,679; and 5,071,904 also can be used as the base coat composition.

As mentioned above, the base coat compositions can contain pigments of various types as colorants. Suitable metallic pigments include aluminum flake, bronze flake, copper flake and the like. Other examples of suitable pigments include mica, iron oxides, lead oxides, carbon black, titanium dioxide, talc, as well as a variety of color pigments.

Optional ingredients for the base coat film-forming compositions include those which are well known in the art of surface coatings and include surfactants, flow control agents, thixotropic agents, fillers, anti-gassing agents, organic co-solvents, catalysts and other suitable adjuvants.

The base coat film-forming compositions can be applied to the substrate by any of the conventional coating techniques, such as brushing, spraying, dipping or flowing, but they are most often spray-applied. The usual spray techniques and equipment for air spraying, airless spraying and electrostatic spraying can be used.

The base coat film-forming compositions are typically applied to the substrate such that a cured base coat having a film thickness ranging from 0.5 to 4 mils (12.5 to 100 micrometers) is formed thereon.

After forming a film of the base coat on the substrate, the base coat can be cured or alternatively given a drying step in which solvent, i.e., organic solvent and/or water, is driven off by heating, or an air drying step before application of the top coat. Suitable drying conditions will depend on the particular base coat film-forming composition and on the ambient humidity with certain water-based compositions. In general, a drying time ranging from 1 to 15 minutes at a temperature of 75° F. to 200° F. (21° C. to 93° C.) is adequate.

The curable powder top coating composition can be applied over at least a portion of the base coat by any of the methods of application described above. As discussed above, the curable powder top coating composition can be applied to a cured or a dried base coat before the base coat has been cured. In the latter case, the top coat and the base coat are cured simultaneously.

Illustrating the invention are the following examples which are not to be considered as limiting the invention to their details. Unless otherwise indicated, all parts and percentages in the following examples, as well as throughout the specification, are by weight.

EXAMPLES

Examples A–I

These examples describe the preparation of crosslinking agents in accordance with the present invention. Examples A and H demonstrate the preparation of polyesters. Example B is a control, demonstrating the preparation of a crosslinking agent with no active hydrogen-containing compound (c). The crosslinking agents of each example were prepared by modifying an appropriate melamine-based aminoplast resin.

Example A

Preparation of the Polyester (1)

Into a two-liter four-necked reaction kettle equipped with a thermometer, a mechanical stirrer, nitrogen inlet, and a separator were placed 955.0 parts of hydrogenated Bisphenol A, 308.0 parts of hexahydrophthalic anhydride, 1.3 parts of dibutyl tin oxide, and 1.3 parts of triisodecylphosphite. The mixture was melted by heating and was further heated to 230° C. while the water resulted from the reaction was removed through the separator. The reaction was stopped when an acid value of 2 was achieved. The polyester had a hydroxyl number of 160 and $T_g$ around 65° C.

Example B

Control

Into a three-liter four-necked reaction kettle equipped with a thermometer, a mechanical stirrer, nitrogen inlet, and means for removing the by-product (methanol) were placed 768.0 parts of Cymel® 300 available from CYTEC Industries, 426.9 parts of the polyester (1) prepared above, 512.2 parts of xylene, and 0.34 part of p-toluenesulfonic acid. The mixture was heated to 80° C. and held for 20 minutes until the mixture became homogeneous. It was then further heated to 118° C. and the temperature was maintained while the methanol by-product was removed from the system. The reaction progress was monitored by measuring the IR spectra of the mixture and was terminated when the end point was detected. The mixture was subsequently cooled to 100° C. and 0.94 parts of sodium carbonate were added. The mixture was further stirred at 100° C. for one hour before being filtered through a 5 micron filtration bag. Thereafter, the mixture was concentrated at a temperature of 100–130° C. in a vacuum of 3–50 mm Hg to remove the xylene solvent. The product thus obtained was a pale yellow solid with a softening temperature of around 40° C.

Example C

Into a two-liter four-necked reaction kettle equipped with a thermometer, a mechanical stirrer, nitrogen inlet, and means for removing the by-product (methanol) were placed 640.0 parts of Cymel® 300, 355.7 parts of the polyester (1) prepared above, 106.0 parts of benzoin, 472.8 parts of xylene, and 0.38 part of p-toluenesulfonic acid. The mixture was heated to 80° C. and held for 20 minutes until the mixture became homogeneous. It was then further heated to 118° C. and the temperature was maintained while the methanol by-product was removed from the system. The reaction progress was monitored by measuring the IR spectra of the mixture and was terminated when the end point was detected. The mixture was subsequently cooled to 100° C. and 1.05 parts of sodium carbonate was added. The mixture was further stirred at 100° C. for one hour before being filtered through a 5 micron filtration bag. Thereafter, the mixture was concentrated at a temperature of 100–130° C. in a vacuum of 3–50 mm Hg to remove the xylene solvent. The product thus obtained was a pale yellow solid with a softening temperature of around 45° C.

Example D

Into a two-liter four-necked reaction kettle equipped with a thermometer, a mechanical stirrer, nitrogen inlet, and means for removing the by-product (methanol) were placed 512.0 parts of Cymel® 300, 279.3 parts of the polyester (1) prepared above, 123.2 parts of isoborneol, 392.4 parts of xylene, and 0.30 part of p-toluenesulfonic acid. The mixture was heated to 80° C. and held for 20 minutes until the mixture became homogeneous. It was then further heated to 118° C. and the temperature was maintained while the methanol by-product was removed from the system. The reaction progress was monitored by measuring the IR spectra of the mixture and was terminated when the end point was detected. The mixture was subsequently cooled to 100° C. and 0.83 parts of sodium carbonate was added. The mixture was further stirred at 100° C. for one hour before being filtered through a 5 micron filtration bag. Thereafter, the mixture was concentrated at a temperature of 100–130° C. in a vacuum of 3–50 mm Hg to remove the xylene solvent. The product thus obtained was a pale yellow solid with a softening temperature of around 45° C.

Example E

Into a two-liter four-necked reaction kettle equipped with a thermometer, a mechanical stirrer, nitrogen inlet, and means for removing the by-product (methanol) were placed 640.0 parts of Cymel® 300, 349.1 parts of the polyester (1) prepared above, 154.0 parts of isoborneol, 106.0 parts of benzoin, 536.4 parts of xylene, and 0.65 part of p-toluenesulfonic acid. The mixture was heated to 80° C. and held for 20 minutes until the mixture became homogeneous. It was then further heated to 118° C. and the temperature was maintained while the methanol by-product was removed from the system. The reaction progress was monitored by measuring the IR spectra of the mixture and was terminated when the end point was detected. The mixture was subsequently cooled to 100° C. and 1.79 parts of sodium carbonate was added. The mixture was further stirred at 100° C. for one hour before being filtered through a 5 micron filtration bag. Thereafter, the mixture was concentrated at a temperature of 100–130° C. in a vacuum of 3–50 mm Hg to remove the xylene solvent. The product thus obtained was a pale yellow solid with a softening temperature of around 50° C.

Example F

Into a two-liter four-necked reaction kettle equipped with a thermometer, a mechanical stirrer, nitrogen inlet, and means for removing the by-product (methanol) were placed 640.0 parts of Cymel®300, 349.1 parts of the polyester (1) prepared above, 162.0 parts of benzyl alcohol, 138.0 parts of benzoin, 536.4 parts of xylene, and 0.65 part of p-toluenesulfonic acid. The mixture was heated to 80° C. and held for 20 minutes until the mixture became homogeneous. It was then further heated to 118° C. and the temperature was maintained while the methanol by-product was removed from the system. The reaction progress was monitored by measuring the IR spectra of the mixture and was terminated when the end point was detected. The mixture was subsequently cooled to 100° C. and 1.79 parts of sodium carbonate was added. The mixture was further stirred at 100° C. for one hour before being filtered through a 5 micron filtration bag. Thereafter, the mixture was concentrated at a temperature of 100–130° C. in a vacuum of 3–50 mm Hg to remove the xylene solvent. The product thus obtained was a pale yellow solid with a softening temperature of around 50° C.

Example G

Into a two-liter four-necked reaction kettle equipped with a thermometer, a mechanical stirrer, nitrogen inlet, and means for removing the by-product (methanol) were placed 640.0 parts of Cymel® 300, 355.7 parts of the polyester (1) prepared above, 102.0 parts of hydroxycyclohexyl phenyl ketone, 471.0 parts of xylene, and 0.38 part of p-toluenesulfonic acid. The mixture was heated to 80° C. and held for 20 minutes until the mixture became homogeneous. It was then further heated to 118° C. and the temperature was maintained while the methanol by-product was removed from the system. The reaction progress was monitored by measuring the IR spectra of the mixture and was terminated when the end point was detected. The mixture was subsequently cooled to 100° C. and 1.05 parts of sodium carbonate was added. The mixture was further stirred at 100° C. for one hour before being filtered through a 5 micron filtration bag. Thereafter, the mixture was concentrated at a temperature of 100–130° C. in a vacuum of 3–50 mm Hg to remove the xylene solvent. The product thus obtained was a pale yellow solid.

Example H

Preparation of the Polyester (2)

Into a three-liter four-necked reaction kettle equipped with a thermometer, a mechanical stirrer, nitrogen inlet, and a separator were placed 850.0 parts of neopentyl glycol, 930 parts of isophthalic acid, 1.8 parts of dibutyl tin oxide, and 1.8 parts of triisodecylphosphite. The mixture was melted by heating and was further heated to 210° C. while the water resulting from the reaction was removed through the separator. The reaction was stopped when the acid value was less than 2. The polyester had a hydroxyl number of 110 and $T_g$ around 28° C.

Example I

Into a two-liter four-necked reaction kettle equipped with a thermometer, a mechanical stirrer, nitrogen inlet, and means for removing the by-product (methanol) were placed 640.0 parts of Cymel® 300, 510.0 parts of the polyester (2) prepared above, 106.0 parts of benzoin, 539.0 parts of xylene, and 0.40 part of p-toluenesulfonic acid. The mixture was heated to 80° C. and held for 20 minutes until the mixture became homogeneous. It was then further heated to 118° C. and the temperature was maintained while the methanol by-product was removed from the system. The reaction progress was monitored by measuring the IR spectra of the mixture and was terminated when the end point was detected. The mixture was subsequently cooled to 100° C. and 1.10 parts of sodium carbonate was added. The mixture was further stirred at 100° C. for one hour before being filtered through a 5 micron filtration bag. Thereafter, the mixture was concentrated at a temperature of 100–130° C. in a vacuum of 3–50 mm Hg to remove the xylene solvent. The product thus obtained was a pale yellow solid.

POWDER COATING COMPOSITIONS

Examples 1 Through 5

For each of the powder coating compositions of Examples 1–5, all of the listed components were blended for 10 seconds at 3500 rpm in a PRISM blender. The powders were then fed through a 19 millimeter, twin screw extruder available from b&p Process Equipment and Systems, by way of an ACCU-RATE auger feeder. The resulting chip was classified to a median particle size of approximately 40 microns. Note that Example 1 is a control, containing a control crosslinking agent.

|  | Example No | | | | |
| --- | --- | --- | --- | --- | --- |
|  | 1 | 2 | 3 | 4 | 5 |
| Fine Clad M 8100[1] | 270 g | 270 g | 270 g | 270 g | 270 g |
| Example B crosslinker | 50 g | | | | |
| Example C crosslinker | | 50 g | | | |
| Example E crosslinker | | | 50 g | | |
| Example D crosslinker | | | | 50 g | |
| Example F crosslinker | | | | | 50 g |
| Morpholine Tosylate[2] | 0.35 g | 0.35 g | 0.35 g | 0.35 g | 0.35 g |
| Resiflow PL 200[3] | 4 g | 4 g | 4 g | 4 g | 4 g |
| Microwax C[4] | 3.0 g | 3.0 g | 3.0 g | 3.0 g | 3.0 g |
| R706[5] | 170 g | 170 g | 170 g | 170 g | 170 g |

[1]FineClad M-8100 is a 25 hydroxyl functional resin from Reichhold Chemicals, Inc.
[2]Morpholine Tosylate is a blocked acid catalyst from Cytec Industries, Inc.

-continued

| | Example No | | | | |
|---|---|---|---|---|---|
| | 1 | 2 | 3 | 4 | 5 |

[3]Resiflow PL 200 is an acrylic flow aid from Monsanto Chemicals Company.
[4]Microwax C is a stearamide wax from Hoechst Aktiengesellschaft.
[5]R706 is TiO2 from E. I. du Pont de Nemours and Company.

TESTING PROCEDURES:

The powder storage stability of each powder coating composition was evaluated by storing a 20 g sample of each powder coating composition at a temperature of 40° C. for a 24 hour period. The stability of the powder was determined upon visual inspection. Powder stability results are reported from best to worst as follows: excellent, good, slightly cakey, cakey, slightly clumpy, clumpy, fused and sintered.

The propensity of the coating composition to "gas" upon curing was tested by increasing the cured film thickness of the powder coating on a test panel until surface defects (i.e., pinholes) formed due to the escape of gases through the coating surface during the cure process. Values reported represent the maximum film thickness achieved just prior to the development of the pinholes in the coating surface.

Chemical resistance and extent of cure was evaluated by double rubs using methyl ethyl ketone. Results reported are the extent of film surface marring or softening in the area contacted with the methyl ethyl ketone after 200 double rubs.

Mar resistance was evaluated as follows. The initial 20° gloss of the cured powder coating of each example was measured using a 20° NOVO-GLOSS 20 statistical glossmeter, available from Gardner Instrument Company, Inc. Each coated substrate was then subjected to scratch testing by linearly scratching the cured coating surface to which an abrasive, such as BON AMI®, had been applied, for ten double rubs using an Atlas AATCC Scratch Tester, Model CM-5, available from Atlas Electrical Devices Company of Chicago, Ill. The test panels were then rinsed with tap water and carefully patted dry with a paper towel. The 20° gloss was measured on the scratched area of each test panel. The number reported is the percent of the initial gloss retained after scratch testing, i.e., 100% X scratched gloss/initial gloss.

The degree of gloss and the degree of haziness (or lack of film clarity) of the cured powder coating was measured using BYK HAZE/GLOSS instrument from BYK Chemical. Higher numbers indicate a higher degree of gloss and haziness.

Flexibility and impact resistance (both direct and reverse impact) was evaluated using a Gardner Impact Tester in accordance with ASTM-D-2794.

Two sets of test panels were prepared. Test results are reported in the following Table 1 for the set of test panels coated with each of the powder coating compositions of Examples 1 through 5 which were cured at 380° F (193.3° C.) for 20 minutes. Test results for an analogous set of coated test panels which were cured at 320° F. (160° C.) for 20 minutes are reported below in the following Table 2.

TABLE 1

| | 1 | 2 | 3 | 4 | 5 |
|---|---|---|---|---|---|
| MEK double rubs | 100 no mar | 100 no mar | 100 no mar | 100 no mar | 100 no mar |
| Gas resistance | 1.4 mil | 3.0 mil | >6.0 mil | 1.6 mil | 7.1 mil |
| Powder stability/40C 1 day | Good | Excellent | Excellent | Excellent | Excellent |
| Powder stability/40C 1 week | Good | Excellent | Excellent | Good | Good |
| Direct Impact (in-lbs.) | 160 | 160 | 160 | 160 | >140 |
| Reverse Impact (in-lbs.) | 160 | 160 | 160 | 160 | >140 |
| Mar (20 Crockmeter) | 87.9 | 87.8 | 97.1 | 76.3 | 92.5 |
| Mar (30 Soft Scrub) | 79.1 | 69.9 | 58.4 | 85.1 | 54.9 |
| Gloss 20°/60° | 12.0/48.5 | 31.0/76.8 | 25.3/75.3 | 10.6/47.7 | 37.3/83.8 |
| Pencil Hardness | 5B | B+ | HB | B | HB |

*Mar is reported as % gloss retention

TABLE 2

| | 1 | 2 | 3 | 4 | 5 |
|---|---|---|---|---|---|
| MEK double rubs | 100 marred | 100 marred | 100 marred | 100 marred | 90 smeared |
| Direct Impact (in-lbs.) | 30 | 30 | 20 | <20 | <20 |
| Reverse Impact (in-lbs.) | <20 | <20 | <20 | <20 | <20 |
| Mar (20 Crockmeter) | 86.6 | 71.1 | 74.7 | 32.3 | 85.7 |
| Mar (30 Soft Scrub) | 75.1 | 54.1 | 55.0 | 44.6 | 47.0 |
| Gloss 20°/60° | 21.6/65.8 | 36.5/80.9 | 28.1/75.5 | 29.5/75.3 | 36.4/83.4 |
| Pencil Hardness | HB− | HB | HB− | HB | HB |

*Mar is reported as % gloss retention

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore we claim:

1. A crosslinking agent comprising an ungelled reaction product of the following:
   (a) at least one aminoplast resin;
   (b) at least one polyfunctional polymer comprising functional groups reactive with aminoplast resin (a) and having a glass transition temperature of at least 15° C.; and (c) at least one compound different from (b) having active hydrogen groups reactive with aminoplast resin (a), said compound selected from at least one of:
(i) compounds having the following structure (I):

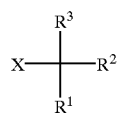

(I)

wherein X is aromatic; $R^1$, $R^2$, and $R^3$ can be the same or different and each independently represents H, (cyclo)alkyl having from 1 to 12 carbon atoms, aryl, alkaryl, aralkyl, or an active hydrogen-containing group, provided that at least one of $R^1$, $R^2$, and $R^3$ represents an active hydrogen-containing group which is reactive with the aminoplast resin (a);

(ii) compounds having the following structure (II) or (III):

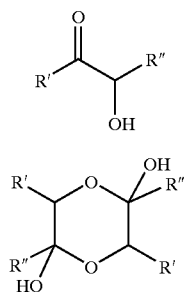

where R' and R" are the same or different and each independently represents an aromatic group or an alkyl group having 1 to 12 carbon atoms; and (iii) compounds different from (i) and (ii) and having a melting point of at least 80° C., selected from borneol, norborneol, isoborneol, 1-adamantanemethanol, 1-adamantanol, 2-methyl-2-adamantanol and 5-norbornen-2-ol;

wherein said crosslinking agent has a glass transition temperature of at least 10° C. and is essentially free of functional groups which are reactive with aminoplast resin.

2. The crosslinking agent of claim 1, wherein the aminoplast resin (a) is or is derived from at least one of glycoluril, aminotriazine and benzoguanamine.

3. The crosslinking agent of claim 2, wherein the aminoplast resin (a) comprises alkoxylated aldehyde condensate of glycoluril.

4. The crosslinking agent of claim 3, wherein the aminoplast resin (a) comprises tetramethoxy methylglycoluril.

5. The crosslinking agent of claim 2, wherein the aminoplast resin (a) comprises (alkoxyalkyl) aminotriazine having one or less non-alkylated NH bond per triazine ring.

6. The crosslinking agent of claim 5, wherein the aminoplast resin (a) comprises (methoxymethyl) aminotriazine.

7. The crosslinking agent of claim 5, wherein the (alkoxyalkyl) aminotriazine has a degree of polymerization of 1.75 or less.

8. The crosslinking agent of claim 1, wherein the polyfunctional polymer (b) is selected from at least one of polyester polymers, polycarbonate polymers, acrylic polymers and polyether polymers.

9. The crosslinking agent of claim 8, wherein the functional groups of the polyfunctional polymer (b) are selected from hydroxyl, carboxylic acid, amine, amide, thiol, urea, carbamate, thiocarbamate, oxazoline, thiooxazoline, oxazolidone, oxazolidinone and mixtures thereof.

10. The crosslinking agent of claim 9, wherein the polyfunctional polymer (b) comprises one or more hydroxyl functional group-containing polymers.

11. The crosslinking agent of claim 10, wherein the polyfunctional polymer (b) comprises one or more hydroxyl functional group-containing polyester polymers.

12. The crosslinking agent of claim 11, wherein said hydroxyl functional group-containing polyester polymer comprises the reaction product of the following:
(i) at least one cycloaliphatic polyol, and
(ii) at least one cyclic polycarboxylic acid or anhydride.

13. The crosslinking agent of claim 12, wherein the cycloaliphatic polyol (i) is selected from hydrogenated Bisphenol A, cyclohexyl dimethanol, cyclohexane diol and mixtures thereof.

14. The crosslinking agent of claim 12, wherein the cyclic polycarboxylic acid (ii) is selected from hexahydrophthalic acid, phthalic acid, isophthalic acid, terephthalic acid, anhydrides thereof and mixtures thereof.

15. The crosslinking agent of claim 12, wherein the polyester polymer comprises the reaction product of the following:
(i) hydrogenated Bisphenol A; and
(ii) hexahydrophthalic acid or anhydride.

16. The crosslinking agent of claim 12, wherein the number average molecular weight of the hydroxyl functional group-containing polyester polymer ranges from 300 to 3000.

17. The crosslinking agent of claim 12, wherein the hydroxyl value of the hydroxyl functional group-containing polyester polymer is at least 130.

18. The crosslinking agent of claim 1, wherein the compound (c) comprises at least one compound having the structure (I).

19. The crosslinking agent of claim 18, wherein at least one of $R^1$, $R^2$, and $R^3$ represents a group comprising an active hydrogen-containing group selected from hydroxyl, amide, amine, carboxylic acid, carbamate, urea, thiol, and mixtures thereof.

20. The crosslinking agent of claim 18, wherein at least one of $R^1$, $R^2$, and $R^3$ represents a group comprising at least one hydroxyl group.

21. The crosslinking agent of claim 18, wherein the compound (c) is selected from benzyl alcohol, phenethyl alcohol, and mixtures thereof.

22. The crosslinking agent of claim 1, wherein the compound (c) comprises at least one of compound (c)(ii).

23. The crosslinking agent of claim 22, wherein the compound (c) comprises a hydroxyl functional group-containing compound having the following structure (II):

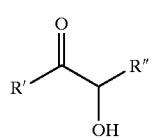

(II)

or dimer derivatives thereof, wherein R' and R" are the same or different and each independently represents an (cyclo)alkyl group having 1 to 12 carbon atoms or an aromatic group.

24. The crosslinking agent of claim 23, wherein one or both of R' and R" represent aromatic groups.

25. The crosslinking agent of claim 24, wherein the compound (c) comprises a compound selected from benzoin, hydroxycyclohexyl phenyl ketone and mixtures thereof.

26. The crosslinking agent of claim 25, wherein the compound (c) comprises benzoin.

27. The crosslinking agent of claim 25, wherein the compound (c) comprises hydroxycyclohexyl phenyl ketone.

28. The crosslinking agent of claim 23, wherein one or both of R' and R" are aromatic groups containing at least one heteroatom selected from furyl, pyridyl, methoxy phenyl, and dimethylaminophenyl groups.

29. The crosslinking agent of claim 23, wherein the active hydrogen group-containing compound (c) comprises a compound having the following structure (III):

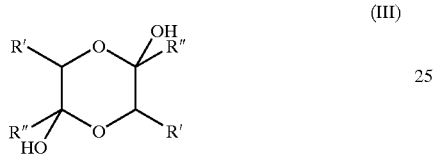

(III)

wherein R' and R" are the same or different and each independently represents an alkyl group having 1 to 12 carbon atoms or an aromatic group.

30. The crosslinking agent of claim 1, wherein the compound (c) comprises at least one of compound (c)(iii).

31. The crosslinking agent of claim 1, wherein the compound (c) comprises a compound selected from benzoin, isoborneol, triphenylmethanol, N-tert-butylacrylamide, p-acetophenetidide and mixtures thereof.

32. The crosslinking agent of claim 1 comprising an ungelled reaction product of the following:

(a) at least one aminoplast resin comprising (alkoxyalkyl) aminotriazine having one or less non-alkylated NH bond per triazine ring;

(b) at least one hydroxyl group-containing polymer having a glass transition temperature of at least 15° C.; and (c) at least one compound different from (b) selected from benzoin, isoborneol, benzyl alcohol and mixtures thereof,
wherein said crosslinking agent has a glass transition temperature of at least 10° C. and is essentially free of hydroxyl groups.

33. A method for preparing a crosslinking agent, the method comprising the following steps:

(I) combining the following reactants:
(a) at least one aminoplast resin;
(b) at least one polyfunctional polymer comprising functional groups reactive with aminoplast resin (a) and having a glass transition temperature of at least 15° C.; and
(c) at least one compound different from (b) having active hydrogen groups reactive with aminoplast resin (a), said compound selected from at least one of:

(i) compounds having the following structure (I):

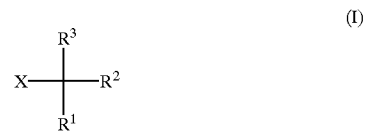

(I)

wherein X is aromatic; $R^1$, $R^2$, and $R^3$ can be the same or different and each independently represents H, (cyclo)alkyl having from 1 to 12 carbon atoms, aryl, alkaryl, aralkyl, or an active hydrogen-containing group, provided that at least one of $R^1$, $R^2$, and $R^3$ represents an active hydrogen-containing group which is reactive with the aminoplast resin (a);

(ii) compounds having the following structure (II) or (III):

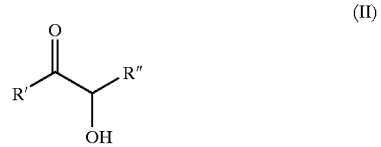

(II)

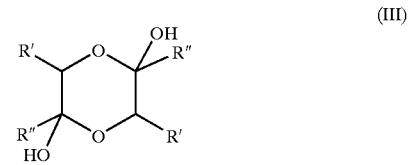

(III)

where R' and R" are the same or different and each independently represents an aromatic group or an alkyl group having 1 to 12 carbon atoms;

(iii) compounds different from (i) and (ii) and having a melting point of at least 80° C., selected from borneol, norborneol, isoborneol, 1-adamantanemethanol, 1-adamantanol, 2-methyl-2-adamantanol and 5-norbornen-2-ol; to form a reaction admixture;

(II) heating the reaction admixture formed in step (1) to a temperature ranging from 90° C. to 135° C.; and (III) maintaining the temperature achieved in (II) for a time sufficient to obtain an ungelled reaction product having a glass transition temperature of at least 15° C. and which is essentially free of active hydrogen-containing groups as determined by infrared spectroscopy.

34. The method of claim 33, wherein the aminoplast resin (a) is or is derived from at least one of glycoluril, aminotriazine and benzoguanamine.

35. The method of claim 34, wherein the aminoplast resin (a) comprises alkoxylated aldehyde condensate of glycoluril.

36. The method of claim 34, wherein the aminoplast resin (a) comprises (alkoxyalkyl)aminotriazine having one or less non-alkylated NH bond per triazine ring.

37. The method of claim 33, wherein the polyfunctional polymer (b) is selected from at least one of polyester polymers, polycarbonate polymers, acrylic polymers and polyether polymers.

38. The method of claim 33, wherein the polyfunctional polymer (b) comprises one or more hydroxyl functional group-containing polymers.

39. The method of claim 38, wherein the polyfunctional polymer (b) comprises one or more hydroxyl functional group-containing polyester polymers.

40. The method of claim 33, wherein the compound (c) comprises at least one compound having the structure (I).

41. The method of claim 40, wherein at least one of $R^1$, $R^2$, and $R^3$ represents a group comprising an active hydrogen-containing group selected from hydroxyl, amide, amine, carboxylic acid, carbamate, urea, thiol and mixtures thereof.

42. The method of claim 40, wherein at least one of $R^1$, $R^2$, and $R^3$ represents a group comprising at least one hydroxyl group.

43. The method of claim 33, wherein the compound (c) is selected from benzyl alcohol, phenethyl alcohol, and mixtures thereof.

44. The method of claim 33, wherein the compound (c) comprises at least one of compound (c)(ii).

45. The method of claim 44, wherein the compound (c) comprises a compound selected from benzoin, hydroxycyclohexyl phenyl ketone, isoborneol and mixtures thereof.

46. The method of claim 33, wherein the compound (c) comprises at least one of compound (c)(iii).

47. The method of claim 33, comprising the following steps:

(I) combining the following reactants:
  (a) at least one aminoplast resin comprising (alkoxyalkyl)aminotriazine having one or less non-alkylated NH bond per triazine ring;
  (b) at least one hydroxyl group-containing polymer having a glass transition temperature of at least 15° C.; and
  (c) at least one compound selected from benzoin, isoborneol, benzyl alcohol and mixtures thereof, to form a reaction admixture;

(II) heating the reaction admixture formed in step (I) to a temperature ranging from 90° C. to 135° C.; and (III) maintaining the temperature achieved in (II) for a time sufficient to obtain an ungelled reaction product having a glass transition temperature of at least 10° C. which is essentially free of active hydrogen-containing groups as determined by infrared spectroscopy.

* * * * *